United States Patent [19]

Zweifel et al.

[11] 4,247,660
[45] Jan. 27, 1981

[54] PHOTO-CROSSLINKABLE POLYMERS HAVING AZIDOPHTHALIMIDYL SIDE GROUPS

[75] Inventors: Hans Zweifel, Basel; Vratislav Kvita, Muttenz; Joseph Berger, Marly, all of Switzerland

[73] Assignee: Ciba-Geigy Corporation, Ardsley, N.Y.

[21] Appl. No.: 948,858

[22] Filed: Oct. 5, 1978

[30] Foreign Application Priority Data

Oct. 14, 1977 [CH] Switzerland .................. 12578/77

[51] Int. Cl.³ .................. C08F 8/00; C08F 26/06
[52] U.S. Cl. .................. 525/61; 204/159.14; 525/329; 525/375; 526/259
[58] Field of Search .................. 526/50, 259; 525/375, 525/329, 61

[56] References Cited

U.S. PATENT DOCUMENTS 4,079,041  3/1978  Baumann et al. .................. 526/50

*Primary Examiner*—Harry Wong, Jr.
*Attorney, Agent, or Firm*—Luther A. R. Hall

[57] ABSTRACT

The photo-crosslinkable polymers according to the invention have azidophthalimidyl side groups of the formula I

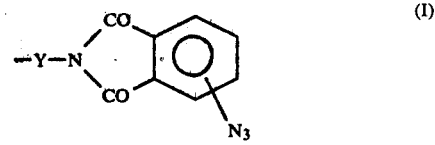

in which Y is a divalent organic radical.

These polymers are prepared either by introduction of the azidophthalimidyl group into an existing polymer chain or by synthesis of polymer chains from monomers which already contain the azidophthalimidyl group.

Compared to corresponding photosensitive polymers of the prior art, these novel polymers have the advantages that they are even more photosensitive and that they also absorb in the long wavelength UV region (at wavelengths above 320 nm).

15 Claims, No Drawings

PHOTO-CROSSLINKABLE POLYMERS HAVING AZIDOPHTHALIMIDYL SIDE GROUPS

The present invention relates to novel photo-crosslinkable polymers having azidophthalimidyl side groups, to processes for their preparation and to their use for photo-crosslinking, especially for making reproductions.

The literature discloses that polymers having azido side groups can be photo-crosslinked and are suitable for photo-mechanical applications (cf., for example, British Pat. No. 843,541, U.S. Pat. No. 3,002,003, Journal of Appl. Poly. Sci., 7, 273–279 (1963) and Japanese Laid-Open Specification No. 74/23,843). These prior-art polymers have disadvantages inasmuch as they absorb predominantly in the short wavelength UV region and are therefore unsuitable, or rather unsuitable, for numerous applications, especially in the field of microelectronics, which demand highly photosensitive substances which absorb in the longer wavelength UV region.

It was therefore the object of the invention to provide novel photo-crosslinkable polymers which are free from the abovementioned disadvantages and are in particular suitable for phototechnical and other applications where crosslinking is effected in the long wavelength UV region, i.e. at not less than about 320 nm.

The invention relates to photo-crosslinkable polymers having azidophthalimidyl side groups of the formula I

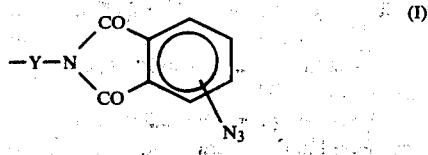

in which Y is unsubstituted or substituted alkylene having 2-18 C atoms, an unsubstituted or substituted phenylene, naphthylene, biphenylene, cyclohexylene or dicyclohexylmethane group or an unsubstituted or substituted

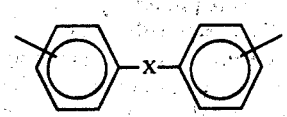

group and X is —O—, —S—, —SO$_2$—, —CH$_2$—,

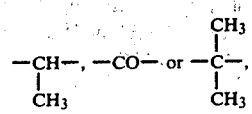

the proportion of azidophthalimidyl groups of the formula I being at least 10 percent, relative to the number of recurring structural units of the polymer.

Preferred polymers are those wherein the proportion of azidophthalimidyl groups of the formula I is about 30 to 100 percent, relative to the number of recurring structural units of the polymer.

The polymers of the invention advantageously have an average molecular weight of at least about 1,000, and preferably an average molecular weight of about 5,000 to 200,000.

The polymers of the invention are, for example, polyethers, polyamines, polyimines, polysaccharides, gelatins or polycondensates based on phenol/formaldehyde (novolacs), but especially homopolymers and copolymers derived from monomers with reactive C=C double bonds.

The polymers of the invention can be prepared in accordance with methods of synthesis known per se for the preparation of macromolecules with photoactive side groups. In principle, the following methods can be employed:

1. Introduction of the azidophthalimidyl group into an existing polymer chain, and 2. Synthesis of the polymer chain from monomers which already contain the photosensitive azidophthalimidyl group, the polymer chain being synthesisable by polymerisation or polyaddition.

In some cases, identical products can be obtained by methods 1 and 2, so that the choice of method is optional. If the azidophthalimidyl groups are being introduced into an already existing polymer chain, this introduction is achieved either by a condensation reaction or by an addition reaction with simultaneous opening of a ring system, for example of a dicarboxylic acid anhydride group or of an epoxide group.

The following products may be mentioned as examples of starting polymers suitable for the introduction of the photosensitive azidophthalimidyl groups of the formula I by condensation or addition: polyacrylic acid, polymethacrylic acid, copolymers of these acids and other ethylenically unsaturated monomers of the above type, copolymers synthesised from maleic anhydride and ethylenically unsaturated monomers, for example methyl vinyl ether, ethylene, styrene, 1-hexene, 1-decene, 1-tetradecene and 1-octadecene, polymers having free hydroxyl groups, for example homopolymers or copolymers of hydroxyalkyl acrylates and hydroxyalkyl methacrylates, polyvinyl alcohols, natural or regenerated cellulose, cellulose derivatives, hydroxyalkylcelluloses, polyethers based on phenoxy resins, phenol-formaldehyde polycondensates (novolacs), polymers containing free glycidyl groups, for example copolymers based on glycidyl acrylate and glycidyl methacrylate, and polymers having free amino groups, for example poly-p-aminostyrene.

Preferred polymers are those having recurring structural units of the formulae II or III

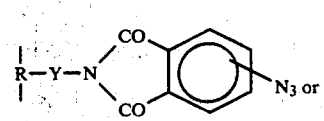

(II)

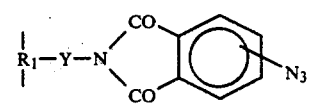

(III)

in which Y is as defined under formula I,

R is 
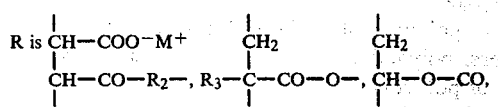

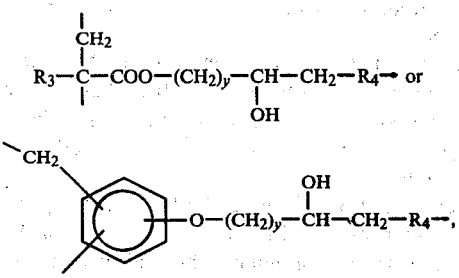

$R_1$ is  $R_2$ is —O—, —NH— or —N-alkyl having 1–4

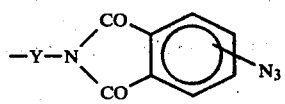

C atoms, $R_3$ is hydrogen or methyl, $R_4$ is

—O—CO—, —NH—, —N-alkyl having 1–4 C atoms or —O—, $M^+$ is a hydrogen ion, an alkali metal cation, the pyridinium cation or $$HN^+\begin{matrix}X_1\\X_2,\\X_3\end{matrix}$$

$X_1$ and $X_2$ independently of one another are hydrogen or alkyl having 1–12 C atoms, $X_3$ is hydrogen, alkyl having 1–12 C atoms or benzyl and y is 1 or 2, and the proportion of

groups is at least 10 percent and preferably at least 30 percent, relative to the number of recurring structural units of the polymer.

Alkylene groups Y can be straight-chain or branched and can be substituted, for example, by one or more phenyl groups, cycloalkyl groups having 5–8 C atoms or aralkyl groups having 7 or 8 C atoms. Amongst the substituted alkylene groups Y, those which are substituted by one or two phenyl groups or by one or two cycloalkyl groups or aralkyl groups according with the definition given, for example the cyclohexyl group or benzyl group, are preferred.

Examples of such alkylene groups Y are the 1,2-ethylene, 1,3- or 1,2-propylene, 1,4- or 1,3-butylene, pentamethylene, hexamethylene, 2-methyl-4-dimethylhexamethylene, 2-dimethyl-4-methylhexamethylene, 1,10-dicyclohexyl- or 1,10-dicyclooctyl-decamethylene, 1,10-diisopropyldecamethylene, 1,1,10,10-tetramethyldecamethylene, 1,10-diethyl-1,10-dimethyldecamethylene, octamethylene, decamethylene, dodecamethylene and 1-ethyl-10,10-dimethylundecamethylene. Unsubstituted straight-chain or branched alkylene groups, especially those having 2–16 C atoms, are preferred.

Phenylene, naphthylene, biphenylene, cyclohexylene or dicyclohexylmethane groups Y, or

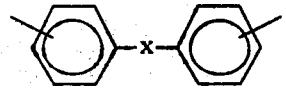

groups Y, can also be substituted, for example by halogen atoms, such as fluorine, chlorine or bromine, alkyl groups having 1–4 C atoms, especially methyl or ethyl, cycloalkyl groups having 5–7 C atoms, especially cyclopentyl and cyclohexyl, or aralkyl groups having 7 or 8 C atoms, such as benzyl or β-phenylethyl. The above groups may carry several substituents of the type mentioned on each ring, but are advantageously substituted by only one of the above groups per ring, especially by chlorine or bromine, methyl or ethyl.

Preferably, however, phenylene, naphthylene, cyclohexylene, biphenylene, dicyclohexylmethane and

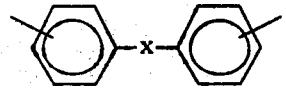

groups Y are unsubstituted, and X is advantageously —O—, —SO$_2$— or —CH$_2$—. Particularly preferentially, Y is unsubstituted alkylene having 2–18, especially 2–16, C atoms, cyclohexylene, naphthylene or phenylene.

The $N_3$ group is preferably bonded to the 3-position of the benzene ring. Preferred meanings of $R_2$ are —O— and —NH—, whilst $R_4$ is in particular —O—CO— or —NH—.

Alkyl groups $X_1$, $X_2$ and $X_3$ may be straight-chain or branched and preferably have 1–4 C atoms. If $M^+$ is a $$HN^+\begin{matrix}X_1\\X_2\\X_3\end{matrix}$$

group, $X_1$ and $X_2$ are preferably alkyl groups having 1–4 C atoms and $X_3$ is preferably an alkyl group having 1–4 C atoms or the benzyl group. Preferably, however, $M^+$ is an alkali metal cation, especially the sodium cation or potassium cation, and in particular a hydrogen ion.

Particularly preferred polymers are those having recurring structural units of the formula II, in which Y is unsubstituted alkylene having 2–18, and especially 2–16, C atoms, cyclohexylene, naphthylene or phenylene, R is a

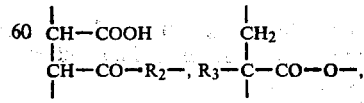

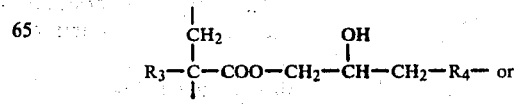

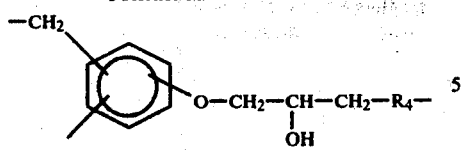

group, $R_2$ is —NH— and especially —O— and $R_4$ is —NH— and especially —O—CO—, or those having recurring structural units of the formula III, in which $R_1$ is as defined and Y is alkylene having 1–4 C atoms, the proportion of structural units of the formula II or III being at least about 30%, relative to the total number of recurring structural units of the polymer.

The polymers of the invention can be obtained by either reacting a compound of the formula IV

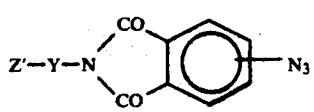 (IV)

in which Y is as defined under formula I and Z' is —OH, —COOH, —COCl, —NH$_2$ or —NH-alkyl having 1–4 C atoms, with a polymer having corresponding functional groups, in a ratio of 1:10 to 1:1, relative to the number of recurring structural units in the polymer, or polymerising a compound of the formula V

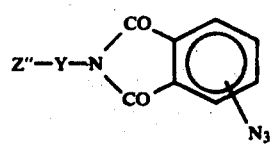 (V)

in which Y is as defined under formula I and Z" is —O—CH=CH$_2$,

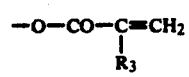

or —COO—CH=CH$_2$ and $R_3$ is hydrogen or methyl, in the presence or absence of ethylenically unsaturated comonomers, the molar ratio of the compound of the formula V to the comonomer being from 1:10 to 1:0 and the polymerisation preferably being carried out as a free radical polymerisation in solution.

Polymers according to the invention which contain recurring structural units of the formula II, in which R is a

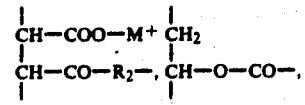

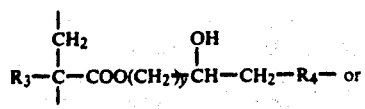

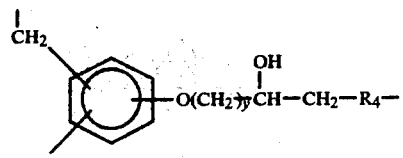

group and M$^+$, $R_2$, $R_3$, $R_4$ and y are as defined above, can be prepared by (a) reacting a compound of the formula IVa

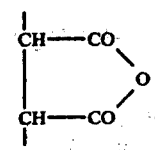 (IVa)

in which Y is as defined above and $Z_1$ is —OH, —NH$_2$ or —NH-alkyl having 1–4 C atoms, with a polymer having recurring structural units

(b) reacting a compound of the formula IVb

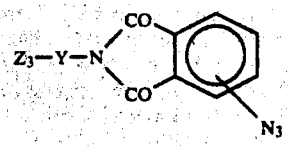 (IVb)

in which Y is as defined above and $Z_2$ is —COCl or —COOH, with a polymer having recurring structural units

|
CH$_2$
|
CH—OH
| or, (c) reacting a compound of the formula IVc (IVc)

in which Y is as defined above and $Z_3$ is —COOH, —OH, —NH$_2$ or —NH-alkyl having 1–4 C atoms, with a polymer have recurring structural units

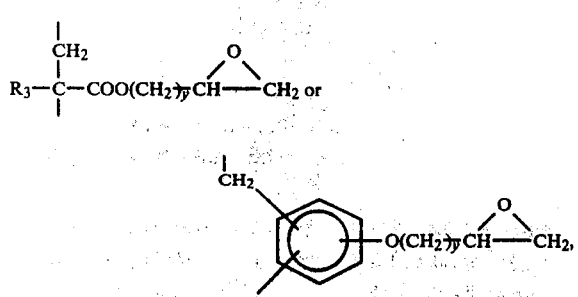

R₃ and y being as defined above, and polymers in which M⁺ is a hydrogen ion being, if desired, converted to salts according to the definition given, and the compounds of the formula IVa, IVb or IVc being employed in a ratio of 1:10 to 1:1, preferably 3:10 to 1:1, relative to the total number of recurring structural units of the polymer.

Polymers according to the invention which contain recurring structural units of the formula II or III, in which R is

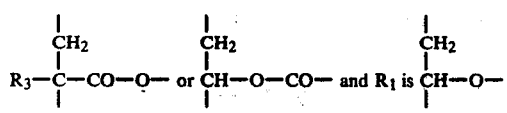

and R₃ is as defined above, can be prepared by using a compound of the formula Va

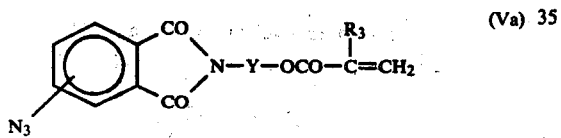

or of the formula Vb

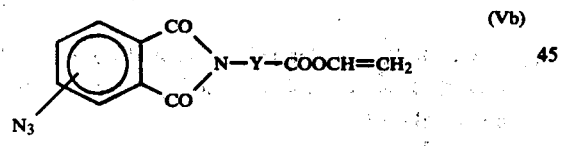

or of the formula Vc

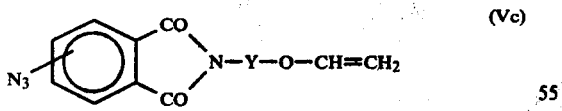

in which Y and R₃ are as defined above, in the presence or absence of ethylenically unsaturated comonomers, the molar ratio of the compound of the formula Va, Vb or Vc to the comonomer being 1:10 to 1:0, preferably 3:10 to 1:0, and the polymerisation preferably being carried out as a free radical polymerisation in solution.

Y in formula Vc in particular is alkylene having 1–4 C atoms.

Comonomers which may be used to produce the polymer chains into which the azidophthalimidyl groups are subsequently introduced, or which may be used as comonomers for copolymerisation with compounds of the formula V, Va, Vb and Vc, are especially those of the formula VI

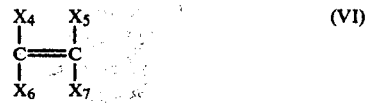

in which $X_4$ and $X_6$ are each hydrogen, $X_5$ is hydrogen, chlorine or methyl and $X_7$ is hydrogen, methyl, chlorine, —CN, —COOH, —CONH₂, phenyl, methylphenyl, methoxyphenyl, cyclohexyl, pyridyl, imidazolyl, pyrrolidonyl, —COO-alkyl having 1–12 C atoms in the alkyl moiety, —COO-phenyl,

—COO-alkyl-OH having 1–3 C atoms in the alkyl moiety,

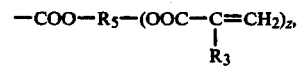

(in which $R_5$ is a straight-chain or branched saturated aliphatic radical having 1–10 C atoms, $R_3$ is hydrogen or methyl and z is an integer from 1 to 3), —OCO-alkyl having 1–4 C atoms in the alkyl moiety, —OCO-phenyl, —CO-alkyl having 1–3 C atoms in the alkyl moiety, alkoxy having 1–6 C atoms, phenoxy, —CH=CH₂ or

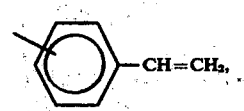

or $X_4$ and $X_5$ are each hydrogen and $X_6$ and $X_7$ together are the

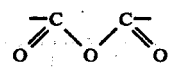

group or are each —COOH or —COO-alkyl having 1–6 C atoms in the alkyl moiety.

The following may be mentioned as examples of suitable comonomers of the formula VI: ethylene, propylene, 1-butene, isoprene, chloroprene, 1,4-butadiene, vinyl chloride, vinylidene chloride, acrylic acid, methacrylic acid, acrylonitrile, methacrylonitrile, chloroacrylonitrile, styrene, nuclear-substituted methylstyrenes, 4-methoxystyrene, vinylcyclohexane, methyl, ethyl, isopropyl, 2-ethylhexyl and phenyl acrylate and methacrylate, vinyl acetate, vinyl propionate, 2,3-epoxypropyl acrylate, 2,3-epoxypropyl methacrylate, vinyl benzoate, 2-vinylpyridine, 4-vinylpyridine, vinylimidazole, vinylpyrrolidone, methyl vinyl ketone, ethyl vinyl ketone, ethyl vinyl ether, n-butyl vinyl ether, maleic acid, fumaric acid and their alkyl esters, and maleic anhydride.

Preferred compounds of the formula VI, and copolymers prepared therefrom, are those in which $X_4$ and $X_6$ are each hydrogen, $X_5$ is hydrogen or methyl and $X_7$ is —OCOCH₃, —COOH or —COO alkyl having 1–8 C atoms in the alkyl moiety, or in which $X_4$, $X_5$ and $X_6$ are each hydrogen and $X_7$ is —CN, chlorine, phenyl or styryl. Particularly preferred copolymerisation components are methyl acrylate, ethyl acrylate, methyl methacrylate, methyl vinyl ether, styrene, maleic anhydride and the copolymers prepared therefrom.

The introduction of azidophthalimidyl groups, according to the invention, into existing polymer chains by means of a condensation reaction or addition reaction can be carried out by methods known per se, advantageously at temperatures of about −50° C. to +150° C. The reaction is preferably carried out in an inert organic solvent or a solvent mixture, in the case of condensation preferably at temperatures of about −20° C. to +100° C. Addition reactions are advantageously carried out at an elevated temperature, in general at temperatures between about 80° and 120° C. or at the reflux temperature.

Examples of suitable solvents for carrying out the condensation reactions or addition reactions are aliphatic or cyclic ketones, such as acetone, methyl ethyl ketone, isopropyl methyl ketone, cyclohexanone, cyclopentanone and γ-butyrolactone, cyclic ethers, such as tetrahydrofuran, tetrahydropyran and dioxan, cyclic amides, such as N-methyl-2-pyrrolidone, N-ethyl-2-pyrrolidone and N-methyl-ε-caprolactam, N,N-dialkylamides of aliphatic monocarboxylic acids having 1–3 C atoms in the acid moiety, such as N,N-dimethylformamide, N,N-dimethylacetamide, N,N-diethylacetamide and N,N-dimethylmethoxyacetamide, pyridine and pyridine bases or other tertiary amines, especially trialkylamines and dialkylbenzylamines having preferably 1–4 C atoms in each alkyl moiety, for example triethylamine and diethylbenzylamine, and dialkyl sulphoxides, such as dimethylsulphoxide and diethylsulphoxide.

Preferred solvents for condensation reactions are cyclic amides and N,N-dialkylamides of the abovementioned type, especially N-methyl-2-pyrrolidone, N,N-dimethylformamide and N,N-dimethylacetamide. For addition reactions, cyclic ethers and cyclic ketones, especially tetrahydrofuran and cyclohexanone, as well as pyridine, are preferred.

If the reaction of compounds of the formula IVa with polymers having structural elements

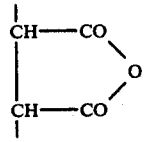

is carried out in the presence of pyridine or of a tertiary amine, the corresponding salts are obtained directly. Salts according to the definition ($M^+\neq H$) can also be prepared by treating the polymers, obtained after the reaction, with corresponding salts, especially alkali metal halides; it is advantageous to purify the polymer salts subsequently by means of dialysis.

Catalysts which assist the desired bond formation can also be added to the reaction solution. For example, if esters are to be formed, it is advantageous to add tertiary amines, for example triethylamine or pyridine, quaternary ammonium salts, such as tetraalkylammonium chlorides having 1–4, preferably 1 or 2, C atoms in each alkyl group, p-toluenesulphonic acid or concentrated sulphuric acid.

After the reaction, the polymers modified with azidophthalimidyl groups can be precipitated by adding a small amount of a solvent of low polarity. Examples of such solvents of low polarity are dialkyl ethers having 2–4 C atoms in each alkyl moiety, such as diethyl ether and di-n-propyl ether, alcohols having up to 6 C atoms, such as methanol, ethanol, isopropanol, butanols and pentanols, and aliphatic, cycloaliphatic or aromatic hydrocarbons, such as n-pentane, n-hexane, cyclohexane, benzene or toluene.

The homopolymerisation of the compounds of the formula V, Va, Vb and Vc, or their copolymerisation with other ethylenically unsaturated monomers, for example those of the formula VI, can also be carried out in a manner known per se, for example in the presence of conventional cationic or anionic initiators. Free radical polymerisation is preferred. For this, advantageously about 0.01 to 5% by weight, preferably 0.01 to 1.5% by weight, relative to the total weight of the monomers, of free radical initiators known per se, such as inorganic or organic peroxides or azo compounds, for example hydrogen peroxide, potassium peroxydisulphate, tert.-butyl hydroperoxide, di-tert.-butyl peroxide, peracetic acid, benzoyl peroxide, diacyl peroxides, cumene hydroperoxide, tert.-butyl perbenzoate, tert.-alkyl peroxycarbonates and α,α'-azo-isobutyronitrile is used. The reaction temperatures for the free radical polymerisation are in general about 30°–100° C.

For free radical polymerisation in the cold, redox systems can also be used, in the abovementioned concentrations, for example a mixture of a peroxide, such as hydrogen peroxide, and a reducing agent, for example divalent iron ions.

The polymerisation can be carried out in a homogeneous phase, for example in the absence of a diluent (block copolymerisation) or in solution, or in a heterogeneous phase, i.e. as a precipitation polymerisation, emulsion polymerisation or suspension polymerisation. Solution polymerisation is preferred.

Suitable solvents are those of the type mentioned in connection with the condensation or addition reaction, as well as halogenated aromatic hydrocarbons, for example chlorobenzene and dichlorobenzenes, halogenated aliphatic hydrocarbons, such as methylene chloride, chloroform, tetrachloroethane and tetrachloroethylene, alkyl esters of aliphatic monocarboxylic acids, having a total of 2–6 C atoms, such as methyl, ethyl and n-butyl formate or acetate, and ethylene glycol dialkyl ethers having 1–4 C atoms in the alkyl moieties, for example ethylene glycol dimethyl ether, diethyl ether and di-n-butyl ether. Mixtures of such solvents can also be used.

After completion of the reaction, the polymer can be precipitated by pouring into suitable organic solvents, for example aliphatic hydrocarbons, alcohols or dialkyl ethers, such as n-pentane, n-hexane, methanol, ethanol and diethyl ether.

The compounds of the formula IV and V, or IVa to IVc and Va to Vc, used to prepare the polymers according to the invention, may themselves be prepared by reacting a compound of the formula VII

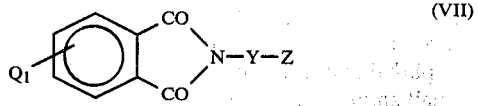

in which Y is as defined under formula I, Z is $-NH_2$, $-NH-$alkyl having 1-4 C atoms, $-OH$, $-COOH$, $-O-CH=CH_2$, $-O-CO-C(R_3)=CH_2$ or $-COO-CH=CH_2$, $R_3$ is hydrogen or methyl and $Q_1$ is a halogen atom, such as chlorine, fluorine or bromine, or especially the nitro group, in an inert organic solvent, at a temperature between about 0° and 120° C., preferably between about 50° and 90° C., with an azide of the formula VIII

in which p is 1 or 2 and $M_1$ is an alkaline earth metal cation, alkali metal cation or quaternary ammonium cation, and where relevant converting the resulting compound of the formula IV, in which Z is $-COOH$, to the corresponding acid chloride by treatment with a suitable chlorinating agent, such as thionyl chloride, oxalyl chloride or phosgene.

If $M_1$ is a quaternary ammonium cation, it is in particular a tetraalkylammonium or trialkylbenzylammonium cation with 1-12, and preferably 1-4, C atoms in each alkyl moiety. The azide is advantageously employed in about 5-50% molar excess, especially about 10-30% molar excess. The use of an alkali metal azide, especially sodium azide, is preferred. Organic solvents which can be used are, in particular, polar solvents, such as aliphatic alcohols having up to 6 C atoms, cyclic ethers and cyclic amides or N,N-dialkylamides of aliphatic monocarboxylic acids of the abovementioned type, as well as aromatic and aliphatic nitriles, such as benzonitrile, acetonitrile and propionitrile. However, the preferred solvents are dialkyl sulphoxides, especially dimethyl sulphoxide.

The compounds of the formula VII can be obtained in a manner known per se, by reacting 3- or 4-nitrophthalic anhydride or the corresponding halogen compounds with an amine of the formula $H_2N-Y-Z$ and then cyclising the resulting amidocarboxylic acid.

Compounds of the formula IV and compounds of the formula V, in which Z" is not $-OCH=CH_2$, can also be obtained by reacting 3- or 4-azidophthalic anhydride with an amine of the formula $H_2N-Y-Z'''$ to give a compound of the formula IX

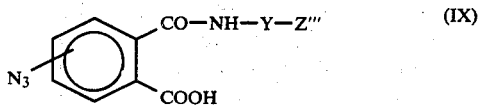

in which Y is as defined above, Z''' is $-OH$, $-COOH$, $-NH_2$, $-NH-$alkyl having 1-4 C atoms, $-O-CO-C(R_3)=CH_2$ or $-COO-CH=CH_2$ and $R_3$ is hydrogen or methyl, and then cyclising the compound of the formula IX in a manner known per se, for example in the presence of dehydrating agents, such as acetic anhydride, after which compounds of the formula IV, in which Z' is $-COOH$, may or may not be converted to the corresponding acid chloride.

Finally, compounds of the formula V, in which Z" is $-O-CO-C(R_3)=CH_2$ or $-COOCH=CH_2$, may also be prepared as follows:

If Z" is $-OCOC(R_3)=CH_2$: by reacting a compound of the formula VII, in which Z is $-OH$, with a corresponding unsaturated acid, acid chloride or ester.

If Z" $-COOCH=CH_2$: by reacting a compound of the formula VII, in which Z is $-COOH$, with a corresponding alcohol or ester in the presence of an acid or base.

The polymers of the invention can be photo-crosslinked and may be used, for example, for the manufacture of printing plates for the offset printing process, for the manufacture of photo-offset lacquers, for unconventional photography, for example for the production of so-called vesicular images, or for colouring polymer images, which after exposure and development are not easily visible, by means of suitable dyes, for example oil-soluble dyes or, if the polymer contains acid groups, for example carboxylic acid or sulphonic acid groups, with cationic dyes. The polymers according to the invention are used in particular as so-called photo-resists for the manufacture of printed circuits by methods known per se. In these, the side of the conductive plate provided with the photo-sensitive layer is exposed through a negative transparency carrying the conductor image, and is then developed, after which the unexposed areas of the layer are removed with developer fluid.

Exposure can be effected by means of sunlight, carbon arcs or xenon lamps, but is preferably carried out with mercury high pressure lamps. The carriers can be coated with the photosensitive polymers by conventional techniques, for example by dipping, spraying, centrifugal coating, cascade coating, curtain coating or so-called roller-coating.

EXAMPLE 1

120.0 g of a mixture of N-(β-methacryloyloxyethyl)-3- and -4-azidophthalimide and 1.20 g of azoisobutyronitrile are dissolved in 545 ml of tetrahydrofuran in a 1 liter reaction vessel equipped with a jacket, stirrer, high-efficiency condenser and thermometer, the operations being carried out under yellow light. This solution is polymerised for 8 hours at 70° C. under a nitrogen atmosphere, with stirring. After completion of the reaction, the mixture is cooled to room temperature (20°-25° C.) and the polymer is precipitated by dripping the reaction solution into 4 liters of n-hexane. 113.8 g (94.8% of theory) of a pale yellowish polymer are obtained; intrinsic viscosity $\eta=0.22$ dl/g (c=0.5% by weight in N,N-dimethylformamide at 25° C.).

To produce photosensitive plates, for example for the manufacture of printed circuits, a copper-laminated epoxy plate is coated with a 5% solution of the above polymer in N,N-dimethylformamide (DMF), using a production technique known per se [cf. Bogenschütz in "Fotolacktechnik" ("Photo-Lacquer Technology"), Eugen G. Lenze-Verlag, DT 7968 Saulgau (1975)], in such a way that after drying at 40° C. a film about 5μ thick is formed. If this plate is now exposed to UV light (λ greater than 320 nm) through a line negative for one minute, the non-crosslinked parts then developed in tetrahydrofuran, and the unprotected copper surface etched away, the circuit corresponding to the line negative is obtained.

EXAMPLE 2

In an apparatus of the type described in Example 1, 105.0 g of a mixture of N-(2-methacryloyloxyethyl)-3- and -4-azidophthalimide, 15.0 g of ethyl acrylate and 1.20 g of azoisobutyronitrile are dissolved in 545 ml of tetrahydrofuran under yellow light. This solution is polymerised for 8 hours at 70° C. under a nitrogen atmosphere, with stirring. After completion of the reaction, the mixture is cooled to room temperature and the polymer obtained is precipitated by dripping the reaction solution into 4 liters of n-hexane. 113.8 g (94.8% of theory) of a pale yellowish polymer are obtained; intrinsic viscosity $\eta = 0.28$ dl/g (c=0.5% by weight in DMF at 25° C.).

EXAMPLE 3

In an apparatus of the type described in Example 1, 120.0 g of a mixture of N-(β-acryloyloxyethyl)-3- and -4-azidophthalimide and 1.20 g of azoisobutyronitrile are dissolved in 545 ml of tetrahydrofuran under yellow light. This solution is polymerised for 8 hours at 70° C. under a nitrogen atmosphere, with stirring. After completion of the reaction, the mixture is cooled to room temperature and the polymer is precipitated by dripping the reaction solution into 4 liters of n-hexane. 111.3 g (92.8% of theory) of a pale yellowish polymer are obtained; intrinsic viscosity $\eta = 0.15$ dl/g (c=0.5% by weight in DMF at 25° C.).

EXAMPLE 4

In an apparatus of the type described in Example 1, 100.0 g of a mixture of N-(β-methacryloyloxyethyl)-3- and -4-azidophthalimide, 20.0 g of methyl methacrylate, 13.3 g of ethyl acrylate and 1.33 g of azoisobutyronitrile are dissolved in 606 ml of tetrahydrofuran under yellow light. The reaction mixture is polymerised for 8 hours at 70° C. under a nitrogen atmosphere, with stirring. After completion of the reaction, the mixture is cooled to room temperature and the polymer is precipitated by dripping the reaction solution into 4 liters of n-hexane. 125.3 g (94.2% of theory) of a pale yellowish polymer are obtained; intrinsic viscosity $\eta = 0.20$ dl/g (c=0.5% by weight in DMF at 25° C.).

EXAMPLE 5

In an apparatus of the type described in Example 1, 90.0 g of a mixture of N-(β-methacryloyloxyethyl)-3- and -4-azidophthalimide, 20.2 g of methyl methacrylate and 1.10 g of azoisobutyronitrile are dissolved in 500 ml of tetrahydrofuran under yellow light. This mixture is polymerised for 8 hours at 70° C. under a nitrogen atmosphere, with stirring. After completion of the reaction, the mixture is cooled to room temperature and the polymer is precipitated by dripping the reaction solution into 4 liters of n-hexane. 104.8 g (95.3% of theory) of a pale yellowish polymer are obtained; intrinsic viscosity $\eta = 0.18$ dl/g (c=0.5% by weight in DMF at 25° C.).

EXAMPLE 6

Following a procedure analogous to that described in the preceding examples, a mixture of N-(β-methacryloyloxyethyl)-3- and -4-azidophthalimide with acrylic acid in a weight ratio of 1:4 is polymerised, in the presence of 0.5% by weight of azoisobutyronitrile, relative to the weight of the monomers, for 20 hours at 60° C. The resulting polymer is precipitated by dripping the reaction solution into diethyl ether. A pale yellowish polymer is obtained; intrinsic viscosity $\eta = 0.23$ dl/g (c=0.5% by weight in DMF at 25° C.).

The polymers obtained in accordance with Examples 2-6 can be used for the manufacture of printed circuits by the methods described.

EXAMPLE 7a 2.5 g of N-(β-hydroxyethyl)-3-azidophthalimide, 5.0 g of a copolymer of methyl vinyl ether and maleic anhydride ("GANTREZ 119", a commercial product from GAF; anhydride content 0.64 mol; $\eta = 5.76$ cP), i.e. a polymer having recurring structural units of the formula

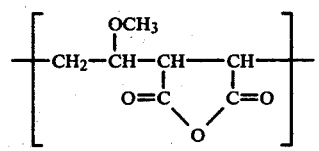

and 0.1 ml of concentrated sulphuric acid are dissolved in 77 ml of tetrahydrofuran in a 250 ml round-bottomed flask equipped with a high-efficiency condenser and a drying tube. After having heated up the reaction mixture, the latter is kept under reflux for 48 hours, with stirring. When the reaction solution has cooled, the polymer obtained is precipitated by dripping the reaction solution into 500 ml of diethyl ether. 6.8 g (91% of theory) of a pale yellow polymer, containing 33.5% by weight of azide, are obtained.

To produce photosensitive plates, for example for the manufacture of printed circuits, a copper-laminated epoxy plate is coated with a 5% solution of the above polymer in DMF in such a way that after drying at 40° C. a polymer film about 5μ thick is formed. By exposing this plate to UV light (λ greater than 320 nm) through a line negative for one minute, developing the non-crosslinked parts in tetrahydrofuran and a 3% sodium carbonate solution, and etching away the unprotected copper surface, the circuit corresponding to the line negative is obtained.

COMPARATIVE EXAMPLE 7b 2.5 g of 4-(2-hydroxy-ethoxy)-phenylazide, 4.4 g of Gantrez An 119 and 0.88 ml of pyridine are dissolved in 78.3 ml of tetrahydrofuran, and stirred for 24 hours at 45°-50°, the operations being carried out under yellow light. (The 4-(2-hydroxyethoxy)-phenylazide corresponds to the β-(4-azidophenoxy)-ethanol of Example 9 of British Pat. No. 843,541). The suspension is cooled to room temperature and filtered and the filtrate is precipitated in 2 liters of diethyl ether. The suspension is filtered with suction and the polymer is dried in vacuo at room temperature.

Yield: 6.7 g = 97% of theory.

Analysis: C 48.9%, H 5.75%, N 3.93%.

A photosensitive plate can also be produced with this polymer, analogously to Example 7a. However, the plate using the polymer according to the invention, of Example 7a, is 20 times more photosensitive than the plate last described, according to Comparative Example 7b.

EXAMPLE 8

7.5 g of a mixture of N-(β-hydroxyethyl)-3- and -4-azidophthalimide, 10.0 g of "Gantrez 119" and 0.2 ml of concentrated sulphuric acid are dissolved in 150 ml of tetrahydrofuran in an apparatus of the type described in Example 7. After having heated up the reaction mixture, the latter is kept under reflux for 48 hours, with stirring. When the reaction solution has cooled, the polymer obtained is precipitated by dripping the reaction solution into 500 ml of diethyl ether. 16.0 g (91.6% of theory) of a pale yellow polymer, containing 43% by weight of azide, are obtained.

EXAMPLE 9

Following a method analogous to that described in Example 7, 3.33 g of N-(4-hydroxyphenyl)-3-azidophthalimide, 10.0 g of "Gantrez 119" and 0.15 ml of concentrated sulphuric acid are dissolved in 135 ml of tetrahydrofuran. After heating up the reaction mixture, the latter is kept under reflux for 24 hours, with stirring. When the reaction solution has cooled, the polymer obtained is precipitated by dripping the reaction solution into 700 ml of diethyl ether. 12.25 g (92.1% of theory) of a pale yellow polymer, containing 25% by weight of azide, are obtained.

EXAMPLE 10

Following a method analogous to that described in Example 7, 3.0 g of N-(4-aminophenyl)-3-azidophthalimide and 6.0 g of "Gantrez 119" are dissolved in 81 ml of tetrahydrofuran. The reaction mixture is then kept under reflux for 2 hours. When it has cooled, the polymer obtained is precipitated by dripping the reaction solution into 500 ml of diethyl ether. 8.15 g (90.5% of theory) of a pale yellow polymer, containing 33.5% by weight of azide, are obtained.

EXAMPLE 11

2.5 g of N-(ω-carboxypentyl)-3-azido-phthalimide, 2.5 g of a styrene/glycidyl methacrylate copolymer (molar ratio 1:1, molecular weight 25,000), i.e. a copolymer of recurring structural units of the formula

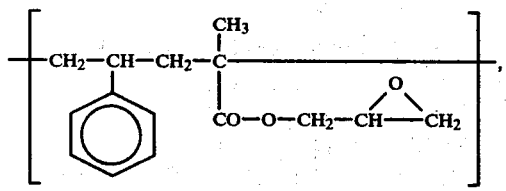

and 0.03 g of tetramethylammonium chloride are dissolved in 45 ml of cyclohexanone in an apparatus of the type described in Example 7. After heating up, the reaction mixture is stirred for 1¾ hours at 110° C. When the reaction solution has cooled, the polymer obtained is precipitated by dripping the reaction solution into 300 ml of n-hexane. 4.49 g (89.9% of theory) of a pale yellow polymer, containing 50% by weight of azide, are obtained.

EXAMPLE 12

0.7 g of N-(4-carboxyphenyl)-3-azidophthalimide, 1.4 g of a methyl methacrylate/glycidyl methacrylate copolymer having recurring structural units of the formula

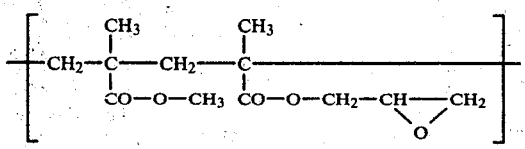

(molar ratio 1:1, molecular weight 25,000) and 0.005 g of tetramethylammonium chloride are dissolved in 25 ml of cyclohexanone in an apparatus of the type described in Example 7. After heating up, the reaction mixture is stirred for 2 hours at 110° C. When the reaction solution has cooled, the polymer obtained is precipitated by dripping the reaction solution into 150 ml of n-hexane. 1.96 g (93.3% of theory) of a pale yellow polymer, containing 33.5% by weight of azide, are obtained.

EXAMPLE 13

1.0 g of N-(2-hydroxynaphth-8-yl)-3-azidophthalimide, 0.94 g of "Gantrez 119" and 0.19 ml of pyridine are dissolved in 16.8 ml of tetrahydrofuran, and stirred for 24 hours at 45°–50° C., the operations being carried out under yellow light. The suspension, cooled to room temperature, is filtered, and the filtrate is precipitated in 2 liters of diethyl ether. The suspension is filtered with suction, and the filter residue is dried at room temperature in vacuo. 1.8 g (95% of theory) of polymer are obtained; analysis C 56.09%, H 4.93%, N 5.42%, azide content 51.5% by weight.

EXAMPLE 14

2.5 g of N-(1-ethyl-10,10-dimethyl-11-hydroxyundecyl)-3-azidophthalimide, 1.95 g of "Gantrez 119" and 0.39 ml of pyridine are dissolved in 34.7 ml of tetrahydrofuran, and stirred for 24 hours at 45°–50° C., in a 50 ml round-bottomed flask equipped with a high-efficiency condenser and drying tube, the operations being carried out under yellow light. The suspension, cooled to room temperature, is filtered, and the filtrate is precipitated in 2 liters of diethyl ether. The suspension is filtered with suction and the filter residue is dried at room temperature in vacuo. 4.3 g of polymer (96% of theory), containing 56.2% by weight of azide, are obtained; analysis C 57.62%, H 7.21%, N 6.72%.

EXAMPLE 15a 2.3 g of polyvinyl alcohol 4–88 (average molecular weight about 13,000, about 12% of acetate groups) are dissolved in 20.5 ml of anhydrous pyridine, and the solution is heated to 100° C., in a 100 ml round-bottomed flask equipped with a high-efficiency condenser and drying tube, the operations being carried out under yellow light. The reaction mixture is kept for 15 hours at 100° C. and is then cooled to 50° C. and diluted with 20.5 ml of anhydrous pyridine. At the same temperature, 0.33 g of 1,4-diazabicyclo[2.2.2]octane, dissolved in 2.1 ml of anhydrous pyridine, are then added and the mixture is stirred for a further hour at 50° C. Finally, 7.0 g (0.022 mol) of 6-(3-azidophthalimidyl)-caproic acid chloride are added and the mixture is stirred for a further 4.5 hours. The reaction mixture is then cooled to room temperature and diluted with 60 ml of acetone. The resulting white suspension is filtered and the filtrate is precipitated in 1.2 liters of water. The product is filtered off with suction and dried in vacuo at room temperature over phosphorus pentoxide. 8.0 g (94% of theory) of a polymer having an azide content of 75.3% by weight are obtained; analysis C 58.74%, H 5.22%, N 15.91%.

The polymers obtained in accordance with Examples 8–15 can be used for producing printed circuits in the manner described.

COMPARATIVE EXAMPLE 15b 4.1 g of the above polyvinyl alcohol 4–88 are dissolved in 36.6 ml of anhydrous pyridine, and the solution is heated to 100° C., the operations being carried out under yellow light. The reaction mixture is kept for 15 hours at 100° C. and is then cooled to 50° C. and diluted with 36.6 ml of anhydrous pyridine. At this temperature, 0.59 g of 1,4-diazabicyclo(2.2.2)octane, dissolved in 3.7 ml of anhydrous pyridine, is added. The mixture is then stirred for 1 hour at 50° C. 7.0 g (0.039 mol) of 4-azido-benzoyl chloride are added at the same temperature, and the mixture is then stirred for 4.5 hours. (The 4-azidobenzoyl chloride corresponds to the product described in British Pat. No. 843,541 (Example 3)).

The reaction mixture is cooled to room temperature and diluted with 80 ml of acetone. The white suspension is filtered and the filtrate is precipitated in 2 liters of water. The product is filtered off with suction and dried in vacuo at room temperature over $P_2O_5$.

Yield: 8.9 g=92% of theory.

Analyses: C 54.93%, H 5.09%, N 14.79%.

Viscosity: 0.35 dl/g, measured on an 0.53% solution in dimethylformamide at 25°.

If the polymers according to Example 15a and 15b are irradiated with UV light of wavelengths above 320 nm, the product according to the invention exhibits a photo-sensitivity which is 10 to 20 times greater than that of the polymer according to Example 15b.

The polymers obtained according to Examples 8–15 can be used for producing printed circuits in the manner described.

EXAMPLES 16–22

10.42 g (0.035 mol) of N-(β-methacryloyloxyethyl)-3-azidophthalimide and 2.32 g (0.023 mol) of ethyl acrylate are dissolved in 50 ml of tetrahydrofuran, and the solution is warmed to 70° C. under nitrogen, the operations being carried out under yellow light. 0.127 g of azoisobutyronitrile is dissolved in 7 ml of tetrahydrofuran and introduced into the monomer solution from a nitrogen-flushed dropping funnel. The reaction mixture is stirred for 7 hours at 70° C. and is then cooled to room temperature, filtered and precipitated in 1 liter of diethyl ether. The slightly yellowish suspension is filtered with suction and the product obtained is dried in vacuo at 30° C. Yield: 11.85 g=93% of theory; 11.8% by weight of N; intrinsic viscosity $\eta$=0.18 dl/g (c=0.5% by weight in DMF at 25° C.).

A copper-coated plate (about 5×10 cm) is coated on a commercial centrifuge with a 10% solution of the above polymer in DMF (viscosity about 1 Pa.s). The copper plate provided with the photolacquer is then dried in a circulating air oven at 60° C. Thereafter the coated plate is exposed for various periods of time, through a 21-step film negative original (a so-called "21-step sensitivity guide"), to a 400 watt mercury high-pressure lamp in front of which is a Pyrex glass filter, the distance from lamp to plate being 60 cm. The exposed plate is developed in 1,1,1-trichloroethane and etched in $FeCl_3$ solution. To determine the photosensitivity, the last step of the original visible after etching is recorded in each case.

| Exposure time | Step |
|---|---|
| 1 minute | 0 |
| 3 minutes | 0–1 |
| 6 minutes | 4 |

The table which follows lists further polymers according to the invention, which have been prepared by the method described above, and whose photosensitivity has subsequently been tested.

TABLE

| Example No. | Monomer I | Mol % | Monomer II | Mol % | Initiator % by weight | dl/g (1) | % by weight N | Exposure time | Step (2) |
|---|---|---|---|---|---|---|---|---|---|
| 17 | N-(β-methacryl-oyloxyethyl)-3-azidophthalimide | 100 | | | (3) AIBN 1% | 0.17 | 14.83 | 3 mins. 6 mins. | 0–1 4 |
| 18 | N-(β-methacryl-oyloxyethyl)-3-azidophthalimide | 70 | methyl methacrylate | 30 | " | 0.27 | 12.58 | 6 mins. 12 mins. | 1 3 |
| 19 | N-(β-methacryl-oyloxyethyl)-3-azidophthalimide | 60 | 2-ethylhexyl acrylate | 40 | " | 0.09 | 11.53 | 6 mins. 30 mins. | 0–1 6 |
| 20 | N-(β-methacryl-oyloxyethyl)-3-azidophthalimide | 50 | 4-vinylpyridine | 50 | " | 0.1 | 12.96 | 6 mins. | 3 |
| 21 | N-(β-methacryl-oyloxyethyl)-3-azidophthalimide | 50 | N-vinylpyrrolidone | 50 | " | | 12.66 | 12 mins. | 3 |
| 22 | N-(β-methacryl-oyloxyethyl)-3-azidophthalimide | 70 | vinyl acetate | 30 | " | | | 6 mins. 10 mins. | 2 3 |

(1) intrinsic viscosity $\eta$, c = 0.5% by weight in DMF at 25° C.
(2) last visible stage after etching with $FeCl_3$
(3) azo-isobutyronitrile The azidophthalimides used in the above examples can be prepared as follows:

(a) N-(β-Hydroxyethyl)-3-azidophthalimide: a mixture of 17.9 g (0.076 mol) of N-(β-hydroxyethyl)-3-nitrophthalimide and 5.11 g (0.078 mol) of sodium azide in 70 ml of dimethyl sulphoxide is stirred for 12 hours at 50° C. The solution is evaporated in vacuo and the residue is stirred with 200 ml of ice water. The crystals which have precipitated are filtered off with suction, rinsed with 20 ml of water and dried for 24 hours at 70° C./100 mm Hg. 17 g (97% of theory) of N-(β-hydroxyethyl)-3-azidophthalimide are obtained; melting point 141° C. (with decomposition). N-(β-Hydroxyethyl)-3-nitrophthalimide, used as the starting material, can be obtained in a manner known per se, by reacting 3-nitrophthalic anhydride with ethanolamine.

(b) Mixture of N-(β-hydroxyethyl)-3- and -4-azidophthalimide: this compound is prepared analogously to N-(β-hydroxyethyl)-3-azidophthalimide, but using, instead of the pure 3-azidophthalimide, a mixture of N-(β-hydroxyethyl)-3- and -4-nitrophthalimide.

(c) N-(β-Methacryloyloxyethyl)-3- and -4-azidophthalimide: 23.2 g of a mixture of N-(β-hydroxyethyl)-3- and -4-azidophthalimide and 10.1 g (0.1 mol) of triethylamine are dissolved in 250 ml of dry methylene chloride and the solution is cooled to 0° C. 10.45 g (0.1 mol) of methacrylyl chloride are added dropwise to this solution at a rate such that the temperature does not rise above 10° C. After completion of the reaction, the mixture is stirred until it has reverted to room temperature. The triethylamine hydrochloride which has precipitated during the reaction is separated from the reaction solution by filtration. The methylene chloride extract is washed neutral with water, dried with sodium sulphate and concentrated in vacuo, without heating. 27.65 g (92.2% of theory) of a mixture of N-(β-methacryloyloxyethyl)-3- and -4-azidophthalimide are obtained.

(d) N-(β-Acryloyloxyethyl)-3- and -4-azidophthalimide: this compound is prepared analogously to the description under (c), using acrylyl chloride instead of methacrylyl chloride.

(e) N-(4-Hydroxyphenyl)-3-azidophthalimide: a mixture of 55 g (0.193 mol) of 4-(3-nitrophthalimidyl)-phenol and 13.8 g (0.212 mol) of sodium azide in 380 ml of dimethyl sulphoxide is heated for 6 hours at 50° C. The reaction mixture is then evaporated in vacuo at 80° C. and the residue is stirred with 1,000 ml of water for 18 hours. After filtering the resulting suspension and drying the residue in a drying cabinet at 60° C. over phosphorus pentoxide, 56.6 g (95% of theory) of N-(4-hydroxyphenyl)-3-azidophthalimide are obtained; melting point 165° C. (with decomposition).

(f) N-(4-Aminophenyl)-3-azidophthalimide: this compound is prepared analogously to the description under (e), using 4-(3-nitrophthalimidyl)-aniline instead of the corresponding phenol. The resulting N-(4-aminophenyl)-3-azidophthalimide has a melting point of 176° C. (with decomposition).

(g) N-(4-Carboxyphenyl)-3-azidophthalimide: this compound is prepared analogously to the description under (e), using 4-(3-nitrophthalimidyl)-benzoic acid instead of the corresponding phenol, and adding triethylamine. The resulting N-(4-carboxyphenyl)-3-azidophthalimide has a melting point of 300° C. (with decomposition).

(h) N-(ω-Carboxypentyl)-3-azidophthalimide: this compound is prepared analogously to the description under (e), using 6-(3-nitrophthalimidyl)-caproic acid instead of the corresponding phenol and adding triethylamine. The resulting N-(ω-carboxypentyl)-3-azidophthalimide has a melting point of 87°-90° C. (with decomposition).

(i) N-(2-Hydroxynaphth-8-yl)-3-azidophthalimide: this compound is prepared analogously to the description under (e), using 1-(3-nitrophthalimidyl)-7-hydroxynaphthalene. The resulting N-(2-hydroxynaphth-8-yl)-3-azidophthalimide has a melting point of 154° C. (with decomposition).

(k) N-(1-Ethyl-10,10-dimethyl-11-hydroxyundecyl)-3-azidophthalimide: this compound is prepared analogously to the description under (e), using N-(1-ethyl-10,10-dimethyl-11-hydroxyundecyl)-3-nitrophthalimide. 14.7 g (71% of theory) of N-(1-ethyl-10,10-dimethyl-11-hydroxyundecyl)-3-azidophthalimide are obtained in the form of a viscous oil which cannot be distilled.

(l) 6-(3-Azidophthalimidyl)-caproyl chloride: 15.0 g (0.05 mol) of 6-(3-azidophthalimidyl)-caproic acid [N-(ω-carboxypentyl)-3-azidophthalimide] are dissolved in 327 g (2.75 mols) of thionyl chloride and the solution is warmed to 80° C., the operations being carried out under yellow light. At 80° C., 0.5 ml of N,N-dimethylformamide is added. The reaction mixture is stirred for 15 minutes at 80° C. and is then cooled to room temperature. The resulting suspension is filtered with suction, under nitrogen. After recrystallising the crude product from 250 ml of dry ligroin, 12.5 g (75.4% of theory) of 6-(3-azidophthalimidyl)-caproyl chloride are obtained; melting point 68°-69° C.

EXAMPLE 23

The polymer obtained according to Example 6 is tested in a photographic layer material. First, a casting solution of the following composition is prepared:

| | |
|---|---|
| gelatin | 2 g/m² |
| polymer according to Example 6 | 1 g/m² |
| wetting agent (polyethylene oxide stearate) | 20% by weight, based on the weight of the polymer |
| photosensitiser (2-p-methoxybenzyl-6'- and -7'-sulphoquinoxaline) | 4% by weight, based on the weight of the polymer |
| hardener (2-hydroxy-6-amino-s-triazine-4-N-methylmorpholinium tetrafluoborate) | 8% by weight, based on the weight of the polymer |

This coating solution is coated onto a transparent carrier, i.e. a polyester film. After the gelatin has hardened, the film is exposed through a screen negative (step wedge with 12 steps) for 15 minutes, using a 400 watt high pressure lamp. The unexposed portions are washed out in water at 20° C. in the course of 20 seconds. The crosslinked polymer is dyed, or rendered visible, with a cationic dye, for example the dye of the formula

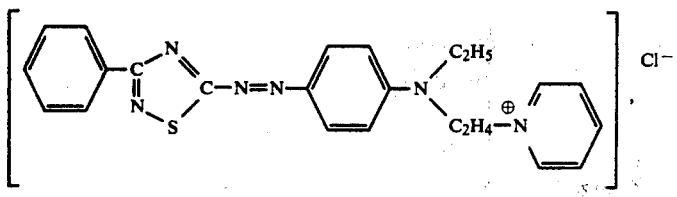

used as an aqueous solution; all 12 steps of the step wedge are reproduced.

COMPARATIVE EXAMPLE

Using the method described in Example 7, N-(β-hydroxyethyl)-3-azidophthalimide is reacted with a maleic anhydride polymer ("Gantrez AN", a commercial product from GAF) to give a polymer having recurring structural units of the formula

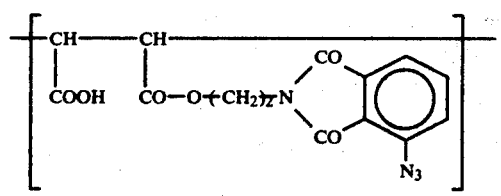

(A)

The same maleic anhydride polymer is reacted analogously with mono-β-hydroxyethyl 3-azidophthalate to give a polymer having recurring structural units of the formula

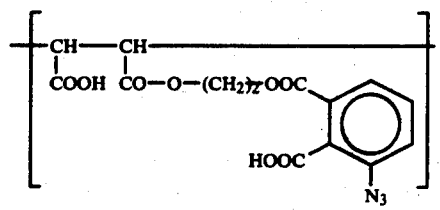

(B)

If polymers (A) and (B) are irradiated with UV light of wavelengths greater than 320 nm, polymer (A) shows 5-10 times greater photosensitivity than polymer (B).

What is claimed is:

1. A photocrosslinkable polymer, having a molecular weight between about 1000 and 200,000, as measured by viscometry of a 0.5% by weight solution in N,N-dimethylforamide at 25° C., which polymer is derived from the polymerization of a monomer having a reactive C=C double bond, said polymer having azidophthalimidyl side groups of the formula I

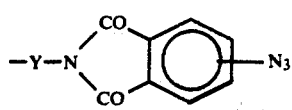

(I)

in which Y is unsubstituted or substituted alkylene having 2-18 C atoms, an unsubstituted or substituted phenylene, naphthylene, biphenylene, cyclohexylene or dicyclohexylmethane group or an unsubstituted or substituted

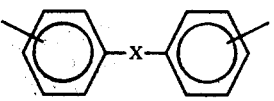

group and X is —O—, —S—, —SO$_2$—,

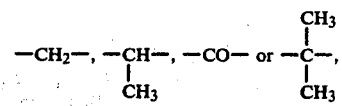

said polymer being either a homopolymer having recurring structural units containing an azidophthalimidyl side group of formula I and being derived and selected from the group consisting of the acrylic monomers, the methacrylic monomers, maleic anhydride and vinyl alcohol, or a copolymer having additionally recurring structural units of the formula VIa

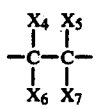

(VIa)

in which X$_4$ and X$_6$ are each hydrogen, X$_5$ is hydrogen, chlorine or methyl and X$_7$ is hydrogen, methyl, chlorine, —CN, —COOH, —CONH$_2$, phenyl, methylphenyl, methoxyphenyl, cyclohexyl, pyridyl, imidazolyl, pyrrolidonyl, —COO-alkyl having 1-12 C atoms in the alkyl moiety, —COO-phenyl,

—COO-alkyl-OH having 1-3 C atoms in the alkyl moiety,

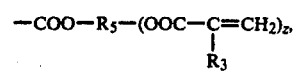

(in which R$_5$ is a straight-chain or branched saturated aliphatic radical having 1-10 C atoms, R$_3$ is hydrogen or methyl and z is an integer from 1 to 3), —OCO-alkyl having 1-4 C atoms in the alkyl moiety, —OCO-phenyl, —CO-alkyl having 1-3 C atoms in the alkyl moiety, alkoxy having 1-6 C atoms, phenoxy, —CH=CH$_2$ or

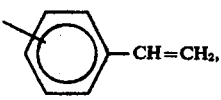

or X₄ and X₅ are each hydrogen and X₆ and X₇ together are the

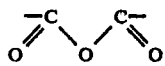

group or are each —COOH or —COO-alkyl having 1–6 C atoms in the alkyl moiety;

with the proportion of structural units having azidophthalimidyl groups of the formula I being at least 10 percent, relative to the total number of recurring structural units of the polymer.

2. A polymer according to claim 1, in which the $N_3$ group in formula I is linked to the 3-position of the benzene ring.

3. A polymer according to claim 1, in which Y in formula I is an alkylene group, having 2–18 C atoms, which is unsubstituted or substituted by one or two phenyl groups, cycloalkyl groups having 5–8 C atoms or aralkyl groups having 7 or 8 C atoms, or is phenylene, naphthylene, biphenylene, cyclohexylene, dicyclohexylmethane or

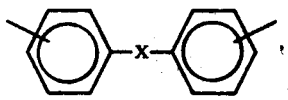

which are unsubstituted or substituted, per ring, by one halogen atom, one alkyl group having 1–4 C atoms, one cycloalkyl group having 5–7 C atoms or one aralkyl group having 7 or 8 C atoms, and X is as defined under formula I.

4. A polymer according to claim 1, which has recurring structural units of the formula II or III

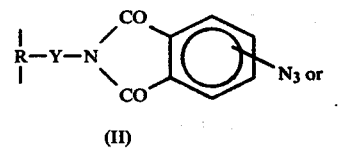

(II)

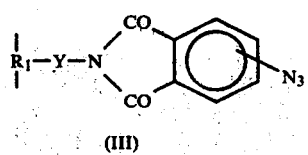

(III)

in which Y is as defined under formula I, R is

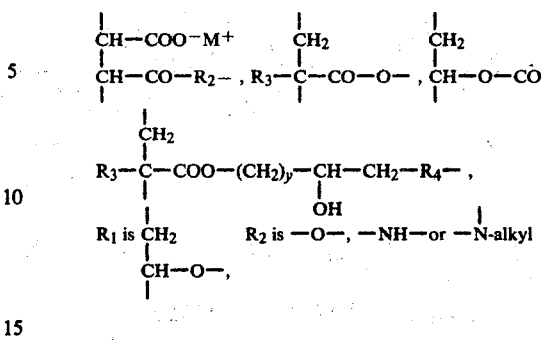

having 1–4 C atoms, $R_3$ is hydrogen or methyl, $R_4$ is —O—CO—, —NH—,

having 1–4 C atoms or —O—, $M^+$ is a hydrogen ion, an alkali metal cation, the pyridinium cation or

$X_1$ and $X_2$ independently of one another are hydrogen or alkyl having 1–12 C atoms, $X_3$ is hydrogen, alkyl having 1–12 C atoms or benzyl and y is 1 or 2, and the proportion of structural units of formula II or III with

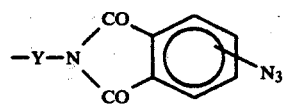

groups is at least 10 percent relative to the total number of recurring structural units of the polymer.

5. A polymer according to claim 4, having recurring structural units of the formula II, in which Y is unsubstituted alkylene having 2–18 C atoms, cyclohexylene, naphthylene or phenylene, R is a

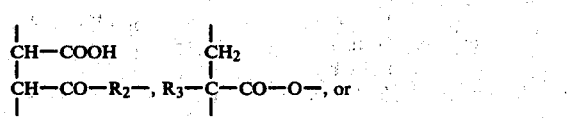

group, $R_2$ is —NH— or —O— and $R_4$ is —NH— or —O—CO—, or having recurring structural units of the formula III, in which $R_1$ is as defined and Y is alkylene having 1–4 C atoms, the proportion of structural units of the formula II or III being at least about 30%, relative to the total number of recurring structural units of the polymer.

6. A polymer according to claim 4, which consists of recurring structural units of the formula II or III and recurring structural units of the formula VIa

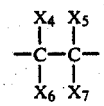

in which $X_4$ and $X_6$ are each hydrogen, $X_5$ is hydrogen, chlorine or methyl and $X_7$ is hydrogen, methyl, chlorine, —CN, —COOH, —CONH$_2$, phenyl, methylphenyl, methoxyphenyl, cyclohexyl, pyridyl, imidazolyl, pyrrolidonyl, —COO-alkyl having 1–12 C atoms in the alkyl moiety, —COO-phenyl,

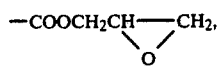

—COO-alkyl-OH having 1–3 C atoms in the alkyl moiety,

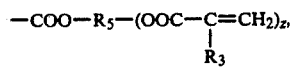

(in which $R_5$ is a straight-chain or branched saturated aliphatic radical having 1–10 C atoms, $R_3$ is hydrogen or methyl and z is an integer from 1 to 3), —OCO-alkyl having 1–4 C atoms in the alkyl moiety, —OCO-phenyl, —CO-alkyl having 1–3 C atoms in the alkyl moiety, alkoxy having 1–6 C atoms, phenoxy, —CH=CH$_2$ or

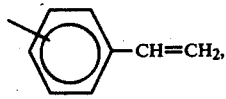

or $X_4$ and $X_5$ are each hydrogen and $X_6$ and $X_7$ together are the

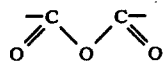

group or are each —COOH or —COO-alkyl having 1–6 C atoms in the alkyl moiety.

7. A polymer according to claim 6, which contains structural units of the formula IVa, in which $X_4$ and $X_6$ are each hydrogen, $X_5$ is hydrogen or methyl and $X_7$ is —OCOCH$_3$, —COOH or —COOalkyl having 1–8 C atoms in the alkyl moiety or in which $X_4$, $X_5$ and $X_6$ are each hydrogen and $X_7$ is —CN, chlorine, phenyl or styryl.

8. A polymer according to claim 4 wherein the proportion of structural units of formula II or III is at least 30 percent, relative to the total number of recurring structural units of the polymer.

9. A polymer according to claim 5 wherein Y is alkylene having 2 to 16 carbon atoms, $R_2$ is —O— and $R_4$ is —O—CO—.

10. A process for the preparation of a polymer having azidophthalimidyl side groups of the formula I according to claim 1, which comprises reacting a compound of the formula IV

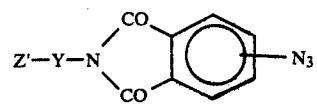

in which Y is as defined under formula I, and Z' is —OH, —COOH, —COCl, —NH$_2$ or —NH-alkyl having 1–4 C atoms, with a preformed or existing polymer having functional groups selected from the group consisting of anhydride, hydroxyl and oxirane, in a ratio of 1:10 to 1:1, relative to the number of recurring structural units in the polymer, or polymerizing a compound of formula V

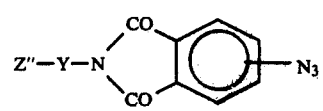

in which Y is as defined under formula I and Z" is —O—CH=CH$_2$,

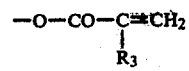

or —COO—CH=CH$_2$ and $R_3$ is hydrogen or methyl, in the presence or absence of ethylenically unsaturated comonomers of formula VI

wherein $X_4$, $X_5$, $X_6$ and $X_7$ are defined under formula VIa in claim 1, the molar ratio of the compound of the formula V to the comonomer of formula VI being from 1:10 to 1:0 and the polymerisation being carried out as a free radical polymerisation in solution.

11. A process for the preparation of a polymer according to claim 4, which contains recurring structural units of the formula II, in which R is a

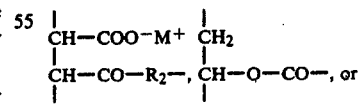

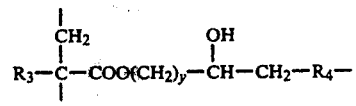

group and $M^+$, $R_2$, $R_3$, $R_4$ and y are as defined under formula II, which process comprises (a) reacting a compound of the formula IVa

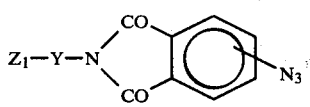 (IVa)

in which Y is as defined under formula II and $Z_1$ is —OH, —$NH_2$ or —NH-alkyl having 1–4 C atoms, with an existing polymer having recurring structural units

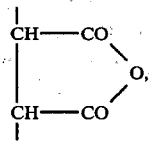

(b) reacting a compound of the formula IVb

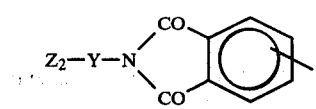 (IVb)

in which Y is as defined under formula II and $Z_2$ is —COCl or —COOH, with an existing polymer having recurring structural units

or (c) reacting a compound of the formula IVc

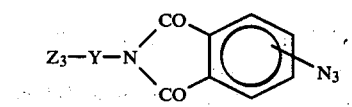 (IVc)

in which Y is as defined under formula II and $Z_3$ is —COOH, —OH, —$NH_2$ or —NH-alkyl having 1–4 C atoms, with an existing polymer having recurring structural units

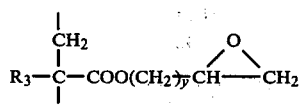

polymers in which $M^+$, $R_3$ and y being as defined under formula II, and the compounds of the formula IVa, IVb or IVc being employed in a ratio of 1:10 to 1:1, relative to the total number of recurring structural units of the polymer.

12. A process for the preparation of a polymer according to claim 4, which contains recurring structural units of the formulae II or III, in which R is

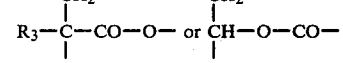

and $R_1$ is

and $R_3$ is as defined under formula II, which process comprises polymerising a compound of the formula Va

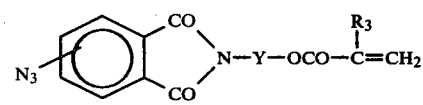 (Va)

or of the formula Vb

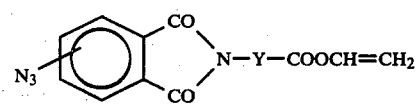 (Vb)

or of the formula Vc

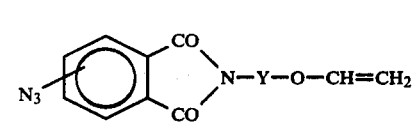 (Vc)

in which Y and $R_3$ are as defined under formula II, in the presence or absence of ethylenically unsaturated comonomers, the molar ratio of the compound of the formula Va, Vb or Vc to the comonomer being 1:10 to 1:0, and the polymerisation being carried out as a free radical polymerisation in solution.

13. A process according to claim 12, wherein the comonomer used has the formula VI

 (VI)

in which $X_4$ and $X_6$ are each hydrogen, $X_5$ is hydrogen, chlorine or methyl and $X_7$ is hydrogen, methyl, chlorine, —CN, —COOH, —$CONH_2$, phenyl, methylphenyl, methoxyphenyl, cyclohexyl, pyridyl, imidazolyl, pyrrolidonyl, —COO-alkyl having 1–12 C atoms in the alkyl moiety, —COO-phenyl,

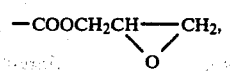

—COO-alkyl-OH having 1–3 C atoms in the alkyl moiety,

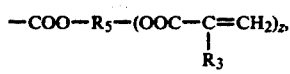

(in which $R_5$ is a straight-chain or branched saturated aliphatic radical having 1-10 C atoms, $R_3$ is hydrogen or methyl and z is an integer from 1 to 3), —OCO-alkyl having 1-4 C atoms in the alkyl moiety, —OCO-phenyl, —CO-alkyl having 1-3 C atoms in the alkyl moiety, alkoxy having 1-6 C atoms, phenoxy, —CH=CH$_2$ or

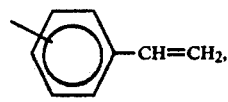

or $X_4$ and $X_5$ are each hydrogen and $X_6$ and $X_7$ together are the $$\overset{-C}{\underset{O}{\diagup}}\overset{}{\underset{O}{\diagdown}}\overset{C-}{\underset{O}{\diagup}}$$

group or are each —COOH or —COO-alkyl having 1-6 C atoms in the alkyl moiety.

14. A process according to claim 11 wherein the compounds of the formula IVa, IVb or IVc are employed in a ratio of 3:10 to 1:1, relative to the total number of recurring structural units of the polymer.

15. A process according to claim 12 wherein the molar ratio of the compound of the formula Va, Vb or Vc to the comonomer is 3:10 to 1:0.

* * * * *

UNITED STATES PATENT AND TRADEMARK OFFICE
CERTIFICATE OF CORRECTION

PATENT NO. : 4,247,660
DATED : JANUARY 27, 1981
INVENTOR(S) : HANS ZWEIFEL ET AL

It is certified that error appears in the above—identified patent and that said Letters Patent is hereby corrected as shown below:

Claim 4, Column 24, lines 4-6 read:

Should read:

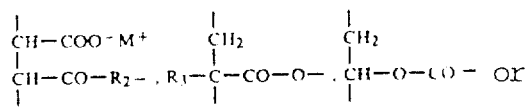 or

Signed and Sealed this

Twenty-third Day of March 1982

[SEAL]

Attest:

Attesting Officer

GERALD J. MOSSINGHOFF

Commissioner of Patents and Trademarks